United States Patent [19]

Valotto et al.

[11] Patent Number: 4,994,002
[45] Date of Patent: Feb. 19, 1991

[54] VARIABLE-SPEED POWER TRANSMISSION DEVICE

[75] Inventors: Gianni Valotto; Bruno Valotto; Luciano Valotto, all of Cittadella, Italy

[73] Assignee: Tecnoquattro S.R.L., Trento, Italy

[21] Appl. No.: 290,595

[22] Filed: Dec. 27, 1988

[51] Int. Cl.⁵ .............................................. F16H 47/04
[52] U.S. Cl. .................................................... 475/72
[58] Field of Search ............... 74/687, 682, 720, 720.5

[56] References Cited

U.S. PATENT DOCUMENTS

| | | | |
|---|---|---|---|
| 3,023,638 | 3/1962 | Westbury et al. | 74/687 |
| 3,055,233 | 9/1962 | Giles | 74/687 |
| 3,470,769 | 10/1969 | Livezey | 74/687 X |
| 3,592,077 | 7/1971 | Polak | 74/687 X |
| 3,722,324 | 3/1973 | Cordner et al. | 74/687 |
| 3,869,939 | 3/1975 | Miyao et al. | 74/687 |
| 3,982,448 | 9/1976 | Polak et al. | 74/687 |
| 4,353,269 | 10/1982 | Hiersig | 74/687 X |

Primary Examiner—Dirk Wright
Attorney, Agent, or Firm—Guido Modiano; Albert Josif

[57] ABSTRACT

The variable-speed power transmission device comprises an input gearing for dividing the power into two fractions having different and variable speeds. The first of these two fractions is transmitted directly to an output gearing, while the second is transmitted to a hydrostatic pump-motor assembly which varies its speed and then to the above mentioned output gearing which recombines it with the first fraction.

4 Claims, 1 Drawing Sheet

VARIABLE-SPEED POWER TRANSMISSION DEVICE

BACKGROUND OF THE INVENTION

The present invention relates to a variable-speed power transmission device.

Various types of devices adapted to continuously vary the speed in a transmission of motion are known, among which mention may be made of mechanical, hydrostatic and electric variators.

Among mechanical variators, those in most widespread use are based on the concept of employing the friction torque transmitted by a belt stretched between two pulleys having a fixed center distance and a variable diameter.

The speed change occurs by axially moving the plates of which the pulleys are composed so as to vary the winding diameters of said pulleys.

Hydrostatic variators transform mechanical energy into hydraulic energy with the aid of a pump-motor assembly.

Direct-current motors in which the applied voltage can be varied can be considered electric variators; as is known, the applied voltage is linked to the number of revolutions.

Other kinds of electric variators employ the principles of varying electrostatic and electromagnetic fields.

All these kinds of variators are however characterized by more or less modest results as to the factors of speed, power, torque, weight, dimensions and efficiency.

SUMMARY OF THE INVENTION

The aim of the present invention is to provide a device capable of varying continuously the output speed with a simpler design and structure than known devices.

A further aim is to provide a speed varying device which is simple in concept and easy to manufacture.

Not least object is to provide a speed varying device which can be obtained at low cost with conventional systems.

This aim, these objects and others which will become apparent hereinafter are achieved by a variable-speed power transmission device, characterized in that it comprises an input gearing for dividing the power into two fractions having different and variable speeds, the first of said two fractions being transmitted directly to an output gearing, the second of said two fractions being transmitted to a hydrostatic pump-motor assembly which varies its speed and then to said output gearing adapted to recombine it with said first fraction.

BRIEF DESCRIPTION OF THE INVENTION

Further characteristics and advantages of the invention will become apparent from the detailed description of an embodiment, illustrated only by way of non-limitative example in FIG. 1 of the accompanying drawings.

DESCRIPTION OF THE PREFERRED EMBODIMENTS

Figure 1:
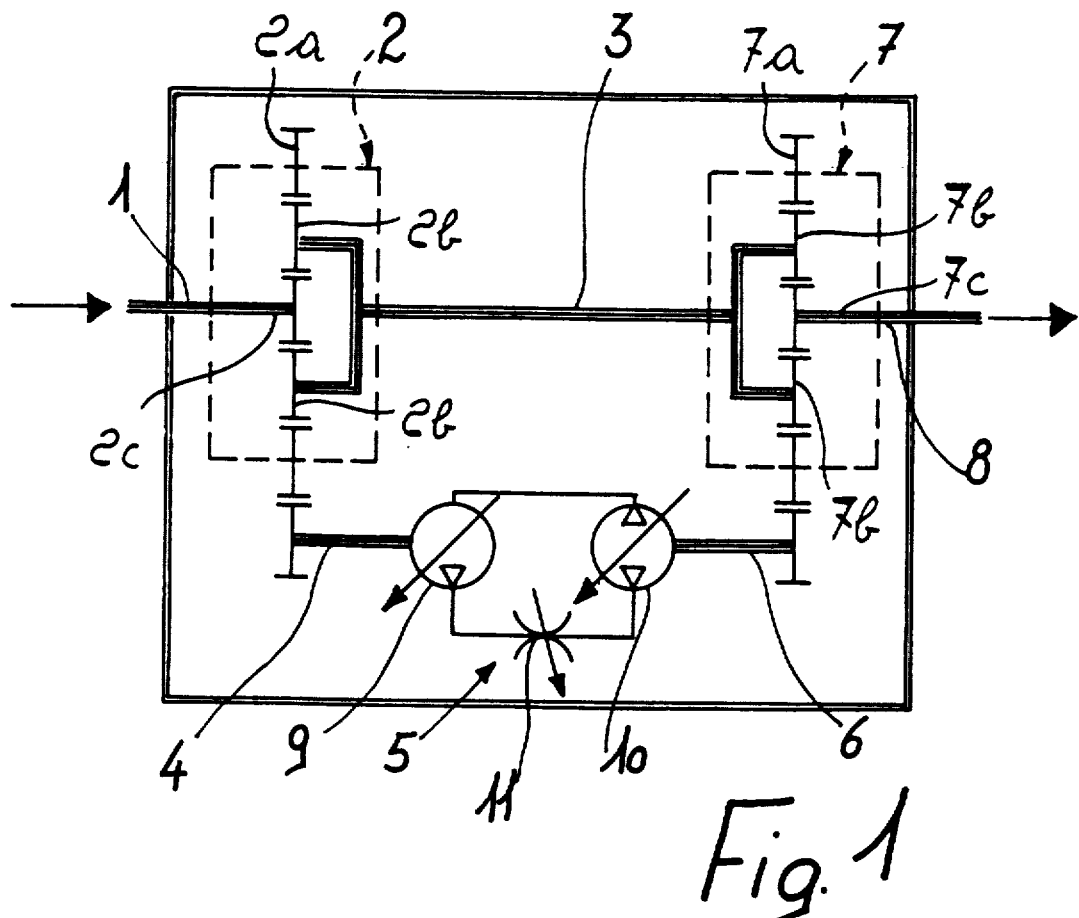

With reference to the above described figure, the variable-speed power transmission device comprises, in a preferred embodiment, an input shaft 1 rotoidally coupled to the axis of a first epicyclic train 2 adapted to transmit the motion to a first intermediate shaft 3, coaxial with respect to said shaft 1, and to a second intermediate shaft 4 connected to the outer planetary gear of said gearing 2.

Said second intermediate shaft 4 is associated with a hydrostatic assembly 5 which transmits the motion to the planetary gear of a second epicyclic train 7 through a third intermediate shaft 6; said gearing 7 also receives the motion from the first intermediate shaft 3.

The motion resulting from the combination of the motions arriving from the intermediate shafts 3 and 6 is transmitted by the second epicyclic train to an output shaft 8 coaxial to said shaft 3.

According to the invention, said hydrostatic assembly 5 is preferably constituted by a hydraulic pump 9 with a fixed and/or variable displacement, by a hydraulic motor 10 with fixed and/or variable displacement and by a controllable flow regulator 11 interposed therebetween.

In the illustrated example, the second intermediate shaft 4 is connected to the external toothing of a crown gear 2a of the epicyclic train 2. The crown gear 2a is rotatable and, in a known manner, is connected to planetary gears 2b, in turn connected to a solar gear 2c.

The third intermediate shaft 6 is connected to the external toothing of the crown gear 7a of the epicyclic train 7, which similarly has planetary gears 7b and a solar gear 7c.

The solar gear 2c is rigidly connected to the input shaft 1, the solar gear 7c is rigidly connected to the output shaft 8 and the planetary gears 2b and 7b are connected by the first intermediate shaft 3.

When the flow regulator 11 blocks the flow of fluid in the hydrostatic assembly 5, the intermediate shaft 4 is blocked and so is the crown gear 2a of the epicyclic train 2. Similarly the shaft 6 is blocked and so is the crown gear 7a of the epicyclic train 7.

In this condition motion is transmitted from input shaft 1 to output shaft 8 entirely via the epicyclic trains 2 and 7 and shaft 3.

By regulating the aperture of the flow regulator 11, motion can progressively be transmitted through the hydrostatic assembly 5 since the crown gear 2a tends to rotate because of the planetary gears' 2b action.

Figure 2:
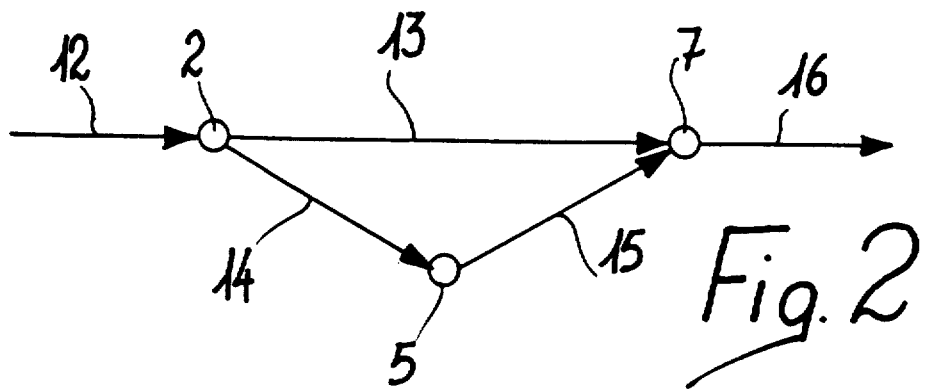

The operating concept of the device according to the present invention is illustrated in FIG. 2, wherein:

the arrow 12 indicates the power N1 in input, having a torque Mt1 and an rpm rate n1;

the arrows 13 and 14 respectively indicate the powers N2 and N3 obtained by variably dividing N1, each respectively having a torque Mt2 and Mt3 and an rpm rate n2 and n3;

the arrow 15 indicates the power N4 obtained after the conversion in the hydrostatic assembly 5, having a torque Mt4 and an rpm rate n4 which are always and in any case different from n3;

the arrow 16 indicates the power M5 resulting in output from the system, having a torque Mt5 and an rpm rate n5.

Considering ideally an efficiency of 1 for the device, the relation linking the various powers is:

$$N5 = N2 + N4 = N1$$

In a first numeric example related to the rotation rate, the following are assumed:

n1 = 1000 rpm
n2 = 400 rpm
n3 = 600 rpm n4 = 300 rpm
so that n5 = n2 + n4 = 400 + 300 = 700 rpm.
In a second numeric example, the follow are assumed:
n1 = 1000 rpm
n2 = 200 rpm
n3 = 800 rpm
n4 = 400 rpm
so that n5 = n2 + n4 = 200 + 400 = 600 rpm.

From the above two examples it is apparent that the resulting speed is variable, while the power is constant if efficiencies are ignored.

The advantage of the device, according to the present invention, over the known devices, is that speed can be variated continuously in a finer manner with a very simplified design.

The invention thus conceived is susceptible to numerous modifications and variations, all of which are within the scope of the inventive concept.

For example, the hydrostatic assembly 5 can be connected to the solar gear or the planetary gear shaft of the epicyclic train, instead of the crown gear as in the illustrated example, depending on the speed ratio needed between input and output or on design features of the device.

Furthermore all the details will be appropriately dimensioned according to the specific design of each individual application required by the technology and may be replaced with other technically equivalent elements.

In practice, the materials employed, as well as the dimensions, may be any according to the requirements.

What is claimed is:

1. A variable-speed power transmission device, comprising:
    an input planetary gearing for splitting input power into two, first and second variable power fractions having different and variable speeds,
    first and a second power transmission paths connected mutually in parallel and to said input planetary gearing for receiving from said input planetary gearing said first and second power fractions and generating respectively a first and a second speeds,
    an output planetary gearing connected to said first and second power transmission paths for combining said first and second power fractions and generating an output rotation rate as the sum of said first and second speeds,
    said first power transmission path including a first intermediate shaft extending from said input to said output planetary gearings,
    said second power transmission path including a hydrostatic pump-motor assembly, a second intermediate shaft interposed between said input planetary gearing and said hydrostatic pump-motor assembly, and a third intermediate shaft interposed between said hydrostatic pump-motor assembly and said output planetary gearing,
    said hydrostatic pump-motor assembly including a hydraulic pump, a hydraulic motor and a controllable flow regulator interposed between said hydraulic pump and said hydraulic motor, said controllable flow regulator controlling flow of fluid in said hydrostatic pump-motor assembly and thus controlling splitting of power between first and second power transmission paths and varying said first and second speeds.

2. A variable-speed power transmission device comprising:
    an input planetary gearing for splitting input power into a first and a second variable power fractions,
    a first and a second power transmission paths connected mutually in parallel and to said input planetary gearing for receiving from said input planetary gearing said first and second power fractions and generating respectively a first and second speeds,
    an output planetary gearing connected to said first and second power transmission paths for combining said first and second power fractions and generating an output rotation rate as the sum of said first and second speeds,
    said first power transmission path including a first intermediate shaft extending from said input to said output planetary gearings,
    said second power transmission path including a hydrostatic pump-motor assembly, a second intermediate shaft interposed between said input planetary gearing and said hydrostatic pump-motor assembly, and a third intermediate shaft interposed between said hydrostatic pump-motor assembly and said output planetary gearing,
    said hydrostatic pump-motor assembly including a hydraulic pump, a hydraulic motor and a controllable flow regulator interposed between said hydraulic pump and said hydraulic motor for controlling flow of fluid in said hydrostatic pump-motor assembly and thus controlling splitting of power between said first and second power transmission paths and said first and second speeds,
    wherein an input is connected to said input planetary gearing and an output shaft is connected to said output planetary gearing, said input shaft, said output shaft and said first intermediate shaft being arranged coaxially to each other.

3. A variable-speed power transmission device, comprising:
    an input shaft,
    an output shaft,
    an input planetary gearing including an input sun gear rigid with said input shaft, input planetary gears and an input crown gear,
    an output planetary gearing including an output sun gear rigid with said output shaft, output planetary gears and an output crown gear,
    a first intermediate shaft connected between said input and said output planetary gears,
    a hydrostatic pump-motor assembly,
    a second intermediate shaft interposed between said input crown gear of said input planetary gearing and said hydrostatic pump-motor assembly,
    a third intermediate shaft interposed between said hydrostatic pump-motor assembly and said output crown gear of said output planetary gearing,
    said hydrostatic pump-motor assembly including a hydrostatic pump, a hydraulic motor and a controllable flow regulator interposed between said hydraulic pump and motor for controlling flow of fluid in said hydraulic pump-motor assembly.

4. A transmission device according to claim 3, wherein said input shaft, said first intermediate shaft and shaft output shaft are arranged coaxially to each other.